United States Patent [19]

Marcoux et al.

[11] Patent Number: 5,980,627

[45] Date of Patent: Nov. 9, 1999

[54] PRODUCTION OF COMMERCIALLY USEFUL MATERIALS FOR WASTE GYPSUM BOARDS

[75] Inventors: Gaétan Marcoux, Candiac; Alphonse Beshay, Beaconsfield, both of Canada

[73] Assignee: Gaetan Marcoux, Candiac, Canada

[21] Appl. No.: 09/094,456

[22] Filed: Jun. 10, 1998

[51] Int. Cl.$^6$ .......................... C04B 14/00; C04B 14/02; C04B 18/04; C04B 20/04

[52] U.S. Cl. .................. 106/461; 106/697; 106/677; 106/772; 106/778; 106/780; 106/782; 106/15.05; 119/171; 119/172; 502/400

[58] Field of Search ................. 106/461, 772, 106/782, 780, 697, 677, 778, 15.05; 119/171, 172; 502/400

[56] References Cited

U.S. PATENT DOCUMENTS

| | | |
|---|---|---|
| 387,221 | 8/1888 | Fürst et al. . |
| 684,091 | 10/1901 | Platt . |
| 1,473,047 | 11/1923 | Rau . |
| 4,129,094 | 12/1978 | Stockel ........................... 119/1 |
| 4,163,674 | 8/1979 | Been . |
| 4,264,543 | 4/1981 | Valenta . |
| 4,409,925 | 10/1983 | Brundrett et al. . |
| 5,360,771 | 11/1994 | Delvaux et al. ................. 501/80 |
| 5,632,848 | 5/1997 | Richards et al. ................ 156/346 |
| 5,648,306 | 7/1997 | Hahn et al. . |

*Primary Examiner*—Michael Marheschi
*Attorney, Agent, or Firm*—Foley & Lardner

[57] ABSTRACT

A commercially useful material is produced from waste gypsum boards containing calcium sulfate dihydrate, by a method comprising the steps of (a) grinding the waste gypsum boards to obtain particles having a substantially uniform size; (b) drying the particles obtained in step (a) to obtain moisture-free particles; (c) heating the moisture-free particles obtained in step (b) at a temperature of 128 to 162° C. to convert the calcium sulfate dihydrate to calcium sulfate hemihydrate; (d) adding water to the particles obtained in step (c) to form a paste; (e) forming the paste obtained in step (d) into a shaped product of a predetermined size; and (f) drying the shaped product obtained in step (e) at a temperature of 105 to 120° C. to obtain a commercially useful material. The materials produced by the method of the invention can be used for a variety of industrial and household purposes. Typical uses include the absorption of oil, grease and chemicals on floors and elsewhere, in animal toilet applications as a cat box absorbent, as carriers for chemicals, such as pesticides and herbicides, in various agricultural and horticultural applications. They can also be used as fillers for agricultural and horticultural applications. When admixed with an adhesive agent such as Portland cement, epoxy or polyester adhesives, they can be applied onto walls and/or floors to provide a decorative coating.

19 Claims, No Drawings ns5,980,627

PRODUCTION OF COMMERCIALLY USEFUL MATERIALS FOR WASTE GYPSUM BOARDS

BACKGROUND OF THE INVENTION

The present invention pertains to improvements in the field of waste recycling. More particularly, the invention is directed to a method of producing commercially useful materials from waste gypsum boards, such as waste GYPROC (trademark) boards.

Waste gypsum boards coming from demolition and gypsum board factories represent a serious threat to the environment as they accumulate by thousands to hundred thousands of tons in many dumping sites. They retain humidity and thus promote the formation of undesirable mildew. Degradation of the calcium sulfate contained in the waste gypsum boards under the influence of infra-red and ultra-violet radiations causes the generation of $H_2S$ and $SO_2$ which contaminate the environment.

Gypsum boards contain calcium sulfate dihydrate, silicon dioxide, cellulosic fibers as well as various metal oxides such as aluminum oxide, calcium oxide, ferric oxide and magnesium oxide. Calcium sulfate dihydrate is known to have liquid absorbing properties, as disclosed for example in U.S. Pat. Nos. 4,163,674 and 4,264,543. However, waste gypsum boards are not suitable for use as absorbents or any other useful products such as fillers for agricultural and horticultural applications.

SUMMARY OF THE INVENTION

It is therefore an object of the present invention to overcome the above drawbacks and to provide a method of producing a commercially useful material from waste gypsum boards.

According to one aspect of the invention, there is thus provided a method of producing a commercially useful material from waste gypsum boards containing calcium sulfate dihydrate. The method of the invention comprises the steps of:

a) grinding the waste gypsum boards to obtain particles having a substantially uniform size;

b) drying the particles obtained in step (a) to obtain moisture-free particles;

c) heating the moisture-free particles obtained in step (b) at a temperature of 128 to 162° C. to convert the calcium sulfate dihydrate to calcium sulfate hemihydrate and thereby obtain particles containing calcium sulfate hemihydrate;

d) adding water to the particles obtained in step (c) to form a paste;

e) forming the paste obtained in step (d) into a shaped product of a predetermined size; and f) drying the shaped product obtained in step (e) at a temperature of 105 to 120° C. to obtain a commercially useful material.

The present invention also provides, in another aspect thereof, a commercially useful material derived from waste gypsum boards and produced by the above method.

Applicant has found quite unexpectedly that commercially useful products, particularly liquid absorbing materials, filler materials for agricultural and horticultural applications and decorative coating materials for walls and floors, can be produced at a low cost from waste gypsum boards by converting the calcium sulfate dihydrate contained in the waste gypsum boards to calcium sulfate hemihydrate having binding properties and serving to bind the other components of gypsum boards. The waste gypsum boards must first be ground to obtain particles having a substantially uniform size, which are then dried to obtain moisture-free particles, for example, by heating the particles at a temperature of 105 to 120° C. in a circulating air oven for a period of time sufficient to evaporate all traces of water. The moisture-free particles are heated at a temperature of 128 to 162° C., preferably about 145° C., to partially dehydrate the calcium sulfate dihydrate and to thereby convert same to calcium sulfate hemihydrate. Care should be taken to avoid heating the moisture-free particles at a temperature above 162° C., since at a temperature of 163° C. calcium sulfate hemihydrate loses all its water of crystallization and is converted to anhydrous calcium sulfate. Water is added to the resulting product to form a paste. The paste is formed into a shaped product of a predetermined size, for example, granules, pellets or balls, and the shaped product is then dried at a temperature of 105 to 120° C. to obtain the desired absorbent or filler material. If the shaped product is dried at a temperature less than 105° C., the evaporation of water is insufficient so that the absorption characteristics of the final product are adversely affected. At a temperature above 120° C., on the other hand, there is a partial conversion of the hydrated calcium sulfate to calcium sulfate hemihydrate, which weakens the final product and leads to the formation of cracks therein.

DESCRIPTION OF PREFERRED EMBODIMENTS

Various additives can be dry-mixed with the product obtained in step (c) with a view to increasing the absorption characteristics, density, hardness and/or water-resistance of the material obtained in step (f); fungicidal agents and/or coloring agents can also be added. For example, when it is desired to increase the absorption characteristics of the final product, wood cellulose fibers, textile fibers, paper pulp, peat fines, mineral fines, charcoal, agricultural waste materials such as corn stalks and peanut shells, or porous plastic materials can be added. Use is preferably made of cellulosic fibers in an amount of 0.5 to 30 wt. %. When it is desired to increase the density of the final product, powdered slag can be added; it is preferably used in an amount of 5 to 80 wt. %. Since powdered slag exhibits binding properties, it can also be used to increase the hardness of the final product. In such a case, the powdered slag is preferably added in an amount of 1 to 80 wt. %. When using powdered slag, acidified water is preferably added in step (d) to reduce the pH so that the final product has a pH of about 7. On the other hand, when it is desired to increase the water-resistance of the final product, gypsum plaster which is also called "Plaster of Paris" can be added. The gypsum plaster is preferably used in an amount of 10 to 80 wt. %. A clumping agent such as sodium bicarbonate can also be added.

A particularly preferred absorbent material produced in accordance with the invention is derived from about 50 wt. % waste gypsum boards and contains about 25 wt. % powdered slag, about 20 wt. % gypsum plaster and about 5 wt. % cellulosic fibers. Such an absorbent material not only exhibits increased hardness and absorption characteristics but is also highly resistant to degradation by water.

A particularly preferred filler material produced by the method of the invention is derived from about 50 wt. % waste gypsum boards and contains about 25 wt. % gypsum plaster and about 25 wt. % powdered slag. Such a filler material exhibits not only increased density and hardness but is also resistant to degradation by water.

The materials produced in accordance with the invention can be used for a variety of industrial and household purposes. Typical uses include the absorption of oil, grease and chemicals on floors and elsewhere, in animal toilet applications as a cat box absorbent, as carriers for chemicals, such as pesticides and herbicides, in various agricultural and horticultural applications. They can also be used as fillers for agricultural and horticultural applications. When admixed with an adhesive agent such as Portland cement, epoxy or polyester adhesives, they can be applied onto walls and/or floors to provide a decorative coating.

The following non-limiting examples illustrate the invention.

EXAMPLE 1

120kg of the waste humid gypsum boards were broken down into small particles and dried at 115° C. in an air dryer until the particles became moisture-free. The temperature of the dryer was gradually increased to heat the moisture-free particles at a temperature of 150° C. for a duration of 20 minutes. The particles thus obtained which contained hemi-hydrated calcium sulfate are hereinafter referred to "H.H.C.S. particles".

10 kg of the H.H.C.S. particles were mixed with a suitable amount of water to form a paste suitable for shaping into granules. The granules were dried at 115° C. then broken down into different mesh sizes from mesh 5 to 40. The broken granules were then redried in the same dryer at 115° C.

EXAMPLE 2

5 kg of the H.H.C.S. particles obtained in Example 1 were well mixed with 2 kg of gypsum plaster. Water was added to the resulting mixture to form a paste suitable for shaping into granules. The granules were dried at 115° C. and then broken down into different mesh sizes from mesh 5 to 40. The broken granules were then redried in the same dryer at 115° C.

EXAMPLE 3

Example 2 was repeated, except that the H.H.C.S. particles were mixed with 3 kg of gypsum plaster.

EXAMPLE 4

Example 2 was repeated, except that the H.H.C.S. particles were mixed with 4 kg of gypsum plaster.

EXAMPLE 5

Example 2 was repeated, except that the H.H.C.S. particles were mixed with 5 kg of gypsum plaster.

EXAMPLE 6

Example 4 was repeated, except that 0.5 kg of defibrated waste hygienic paper was added to the mixture containing the H.H.C.S. particles and gypsum plaster, prior to adding the water.

EXAMPLE 7

Example 2 was repeated, except that the H.H.C.S. particles were mixed with 1 kg of powdered slag.

EXAMPLE 8

Example 2 was repeated, except that the H.H.C.S. particles were mixed with 2 kg of powdered slag.

EXAMPLE 9

Example 2 was repeated, except that the H.H.C.S. particles were mixed with 3 kg of powdered slag.

EXAMPLE 10

Example 2 was repeated, except that the H.H.C.S. particles were mixed with 4 kg of powdered slag.

EXAMPLE 11

Example 2 was repeated, except that the H.H.C.S. particles were mixed with 5 kg of powdered slag.

EXAMPLE 12

Example 8 was repeated, except that 1 kg of gypsum plaster was added to the mixture containing the H.H.C.S. particles and powdered slag, prior to adding the water.

EXAMPLE 13

Example 12 was repeated, except that the amount of powdered slag added was 2 kg.

EXAMPLE 14

Example 12 was repeated, except that the amount of powdered slag added was 3 kg.

EXAMPLE 15

Example 12 was repeated, except that the amount of powdered slag added was 4 kg.

EXAMPLE 16

Example 12 was repeated, except that the amount of powdered slag added was 5 kg.

The bulk density, hardness, water absorption and resistance to water of the products obtained in Examples 1 through 16 were tested.

The bulk density was determined by filing a graduated cylinder without tamping. The hardness was determined according to the standard test ASTM # E728-91, and compared with the hardness of granules made from 100 wt. % gypsum plaster. The water absorption was determined according to the procedure described in U.S. Pat. No. 4,183,763 (col. 11). The resistance to water was determined by soaking the granules (2 g) in water for 2–4 hours and compressing with a spatula.

The results are reported in the following Table:

| Ex. No. | Bulk density pound/feet$^3$ | Hardness | Water absorption % | Resistance to water | Suitable application |
| --- | --- | --- | --- | --- | --- |
| 1 | 46 | 56% | 0.8 | Week | Animal litter |
| 2 | 48 | 71% | 0.65 | Moderate | Animal litter |
| 3 | 49 | 80% | 0.6 | Moderate | Animal litter |
| 4 | 51 | 86% | 0.55 | Moderate | Animal litter |
| 5 | 50.5 | 99.5% | 0.5 | Good | Animal litter |
| 6 | 45.2 | 83% | 0.75 | Moderate | Animal litter |
| 7 | 50 | 80% | 0.6 | Good | Animal litter |
| 8 | 55 | 92% | 0.5 | Good | Animal litter |
| 9 | 58 | 99% | 0.6 | Good | Animal litter |
| 10 | 62 | 102% | 0.5 | Very good | Animal litter & absorbent |
| 11 | 69 | 106% | 0.4 | Very good | Absorbent |
| 12 | 56 | 125% | 0.38 | Very good | Absorbent |

-continued

| Ex. No. | Bulk density pound/feet³ | Hardness | Water absorption % | Resistance to water | Suitable application |
|---|---|---|---|---|---|
| 13 | 58 | 142% | 0.3 | Very good | Absorbent |
| 14 | 63 | 167% | 0.3 | Very good | Absorbent |
| 15 | 68 | 189% | 0.31 | Excellent | Absorbent |
| 16 | 72 | 207% | 0.29 | Excellent | Absorbent |

We claim:

1. A method of producing an absorbent or filler material from waste gypsum boards containing calcium sulfate dihydrate, comprising the steps of:
   a) grinding the waste gypsum boards to obtain particles having a substantially uniform size;
   b) drying the particles obtained in step (a) to obtain moisture-free particles;
   c) heating the moisture-free particles obtained in step (b) at a temperature of 128 to 162° C. to convert the calcium sulfate dihydrate to calcium sulfate hemihydrate and thereby obtaining particles containing calcium sulfate hemihydrate;
   d) adding water to the particles obtained in step (c) to form a paste;
   e) forming the paste obtained in step (d) into a shaped product; and
   f) drying a shaped product obtained in step (e) at a temperature of 105 to 120° C. to obtain an absorbent or filler material.

2. A method as claimed in claim 1, wherein step (b) is carried out by heating the particles obtained in step (a) at a temperature of 105 to 120° C.

3. A method as claimed in claim 1, wherein step (c) is carried out at a temperature of about 145° C.

4. A method as claimed in claim 1, further including the step of dry-mixing the particles obtained in step (c), prior to adding water, with at least one additive for increasing absorption characteristics of the material obtained in step (f).

5. A method as claimed in claim 4, wherein said additive is selected from the group consisting of wood cellulose fibers, textile fibers, paper pulp, peat fines, mineral fines, agricultural waste materials and porous plastic materials.

6. A method as claimed in claim 5, wherein said additive comprises wood cellulose fibers.

7. A method as claimed in claim 6, wherein the wood fibers are added in an amount of 0.5 to 30 wt. %.

8. A method as claimed in claim 1, further including the step of dry-mixing the particles obtained in step (c), prior to adding water, with an additive for increasing density of the product obtained in step (f).

9. A method as claimed in claim 8, wherein said additive comprises powdered slag.

10. A method as claimed in claim 9, wherein the powdered slag is added in an amount of 5 to 80 wt. %.

11. A method as claimed in claim 1, further including the step of dry-mixing the particles obtained in step (c), prior to adding water, with an additive for increasing hardness of the product obtained in step (f).

12. A method as claimed in claim 11, wherein said additive is powdered slag.

13. A method as claimed in claim 12, wherein the powdered slag is added in an amount of 1 to 80 wt. %.

14. A method as claimed in claim 1, further including the step of dry-mixing the particles obtained in step (c), prior to adding water, with an additive for increasing water-resistance of the product obtained in step (f).

15. A method as claimed in claim 14, wherein said additive comprises gypsum plaster.

16. A method as claimed in claim 15, wherein the gypsum plaster is added in an amount of 10 to 80 wt. %.

17. A method as claimed in claim 1, further including the step of dry-mixing the particles obtained in step (c), prior to adding water, with an additive selected from the group consisting of fungicidal agents and coloring agents.

18. A method as claimed in claim 1, further including the step of dry-mixing the particles obtaining in step (c), prior to adding water, wish gypsum plaster and wood cellulose fibers.

19. A method as claimed in claim 18, wherein the gypsum plaster is added in an amount of about 20 wt % and the wood cellulose fibers are added in an amount of about 5 wt. %.

* * * * *